US011520300B2

(12) United States Patent
Amarantidis-Koronaios et al.

(10) Patent No.: US 11,520,300 B2
(45) Date of Patent: Dec. 6, 2022

(54) LOAD CONTROLLER

(71) Applicant: BAE Systems plc, London (GB)

(72) Inventors: Georgios Alexandros
Amarantidis-Koronaios,
Loughborough (GB); Ian Roger
Harrington, Preston (GB); Roger
Dixon, Loughborough (GB)

(73) Assignee: BAE Systems plc, London (GB)

( * ) Notice: Subject to any disclaimer, the term of this patent is extended or adjusted under 35 U.S.C. 154(b) by 95 days.

(21) Appl. No.: 17/254,518

(22) PCT Filed: Jun. 27, 2019

(86) PCT No.: PCT/GB2019/051808
§ 371 (c)(1),
(2) Date: Dec. 21, 2020

(87) PCT Pub. No.: WO2020/002915
PCT Pub. Date: Jan. 2, 2020

(65) Prior Publication Data
US 2021/0173361 A1 Jun. 10, 2021

(30) Foreign Application Priority Data

Jun. 29, 2018 (EP) ..................................... 18180911
Jun. 29, 2018 (GB) ..................................... 1810716

(51) Int. Cl.
G05B 13/04 (2006.01)
H02J 13/00 (2006.01)
(52) U.S. Cl.
CPC ...... G05B 13/048 (2013.01); H02J 13/00002 (2020.01)

(58) Field of Classification Search
CPC .......... G05B 13/048; G05B 2219/2639; G05B 13/04; G05B 19/042; H02J 13/00002; Y02B 90/20; Y04S 20/00
See application file for complete search history.

(56) References Cited

U.S. PATENT DOCUMENTS 4,523,517 A 6/1985 Cronin
5,823,468 A 10/1998 Bothe
(Continued)

FOREIGN PATENT DOCUMENTS

EP 2275346 A2 1/2011
EP 2387123 A2 11/2011
(Continued)

OTHER PUBLICATIONS

International Search Report and Written Opinion of International Application No. PCT/GB2016/052660, dated Nov. 3, 2016, 14 pages.
(Continued)

Primary Examiner — Ziaul Karim
(74) Attorney, Agent, or Firm — Maine Cernota & Rardin

(57) ABSTRACT

There is provided a load controller for a system, the system comprising a first sub-system arranged to deliver a first load, the load controller being operable to: acquire a first target load profile, being the load initially desired for delivery by the first sub-system over an operational period; measure in real time during an update window within the operational period: a first parameter of the first sub-system, to obtain a first measured Load Controller monitor signal; and the first load, to obtain a first measured load signal; develop in real time a model of the first sub-system, using the first measured monitor signal and the first measured load signal, the model relating the first load to the first parameter; given the first target load profile, and the model of the first sub-system, generate for a future period a first predicted monitor signal,
(Continued)

the future period being ahead of the update window; and determine whether the first predicted monitor signal satisfies at least one predetermined criterion.

14 Claims, 4 Drawing Sheets

(56) References Cited

U.S. PATENT DOCUMENTS

| | | | |
|---|---|---|---|
| 6,124,646 | A | 9/2000 | Artinian |
| 6,260,522 | B1 | 7/2001 | Stolk et al. |
| 7,076,335 | B2 | 7/2006 | Seeman |
| 7,898,789 | B1 | 3/2011 | Jarvinen |
| 2002/0128759 | A1 | 9/2002 | Sodoski |
| 2003/0205641 | A1 | 11/2003 | McElroy |
| 2003/0207164 | A1 | 11/2003 | McElroy |
| 2004/0243636 | A1 | 12/2004 | Hasiewicz |
| 2008/0058998 | A1 | 3/2008 | Breit |
| 2008/0150356 | A1 | 6/2008 | Boeing |
| 2009/0152942 | A1 | 6/2009 | Waite |
| 2010/0152925 | A1 | 6/2010 | Goupil |
| 2011/0137575 | A1* | 6/2011 | Koul ............... G05B 23/0245 702/34 |
| 2011/0210606 | A1 | 9/2011 | Selker |
| 2012/0161512 | A1 | 6/2012 | Metzler |
| 2013/0099560 | A1 | 4/2013 | Shipley et al. |
| 2014/0084817 | A1* | 3/2014 | Bhavaraju ............... B60L 50/40 307/46 |
| 2015/0362923 | A1 | 12/2015 | Westervelt |
| 2018/0155061 | A1 | 6/2018 | Bewlay |
| 2018/0373827 | A1* | 12/2018 | Meagher ............... G05B 17/02 |

FOREIGN PATENT DOCUMENTS

| | | |
|---|---|---|
| GB | 2491982 A | 12/2012 |
| WO | 2015034532 A1 | 3/2015 |

OTHER PUBLICATIONS

Search Report under Section 17(5) of Great Britain Application No. GB1515542.7, dated Feb. 16, 2016, 3 pages.
Office Action for U.S. Appl. No. 18/755,875, dated Apr. 24, 2020, 42 Pages.
Office Action for U.S. Appl. No. 18/755,875, dated Aug. 5, 2020, 17 Pages.
Notice of Allowance for U.S. Appl. No. 15/755,875, dated Oct. 19, 2020, 9 Pages.
European Search Report for U.S. Appl. No. 18/180,911 2, dated Dec. 7, 2018, 7 Pages.
Great Britain Search Report for Patent Appl. No. 1810716.9, dated Dec. 6, 2018, 3 Pages.
International Search Report and Written Opinion for PCT Appl. No. PCT/GB2019/051808, dated Oct. 28, 2019, 13 Pages.
International Preliminary Report on Patentability for PCT Appl. No. PCT/GB2019/051808, dated Dec. 29, 2020, 8 Pages.
International Preliminary Report on Patentability for PCT Appl. No. PCT/GB2019/052660, dated Mar. 6, 2018, 10 Pages.
Search Report for Great Britain Appl. No. 1614572.4, dated Jan. 27, 2017, 6 Pages.

\* cited by examiner

LOAD CONTROLLER

RELATED APPLICATIONS

This application is a national phase application filed under 35 USC §371 of PCT Application No. PCT/GB2019/051808 with an International filing date of Jun. 17, 2019, which claims priority of GB patent application 1810716.9 filed Jun. 29, 2018 and EP patent application 18180911.2 also filed Jun. 29, 2018. All of these applications are incorporated herein by reference in their entirety for all purposes.

FIELD OF THE INVENTION

The present invention relates to a load controller, and to a method for controlling a load at a system.

BACKGROUND OF THE INVENTION

In various complex systems, such as the power generation system of an aircraft, an overall system is comprised by one or more sub-systems.

Sub-systems, such as on-aircraft generators, are prone to various faults and failures.

Often, such sub-systems are prone to overheating and can be monitored by a thermomechanical fuse within the system. The thermomechanical fuse can operate so that if a monitored temperature exceeds a threshold, the fuse blows so that power is no longer supplied to the sub-system.

SUMMARY OF THE INVENTION

According to a first aspect of the present invention there is provided a load controller for a system, the system comprising a first sub-system arranged to deliver a first load, the load controller being operable to: acquire a first target load profile, being the load initially desired for delivery by the first sub-system over an operational period; measure in real time during an update window within the operational period: a first parameter of the first sub-system, to obtain a first measured monitor signal; and the first load, to obtain a first measured load signal; develop in real time a model of the first sub-system, using the first measured monitor signal and the first measured load signal, the model relating the first load to the first parameter; given the first target load profile, and the model of the first sub-system, generate for a future period a first predicted monitor signal, the future period being ahead of the update window; and determine whether the first predicted monitor signal satisfies at least one predetermined criterion.

Such a provision of a model which is developed in real time enables the controller to take into account a fault which occurs in the operational sub-system and amend loads accordingly. This can tend to offer options regarding how the system reacts to the fault. For instance it may no longer be necessary to completely shut off power to the sub-system; instead a graded response can be taken whereby load is reduced in line with the severity of the fault.

The load controller may be operable to: recognise that the first predicted monitor signal is incompatible with the predetermined criterion and determine at the first processing module an updated load profile for the first sub-system such that the first predicted monitor signal satisfies the predetermined criterion.

The load controller may be for a system comprising at least one further sub-system for delivering a further load, and as such the load controller may be further operable to: acquire a further target load profile, being the load initially desired for delivery by the further sub-system over the operational period; measure in real time during an update window within the operational period: a further parameter of the further sub-system, to obtain a further measured monitor signal; and the further load, to obtain a further measured load signal; develop in real time a model of the further sub-system, using the further measured monitor signal and the further measured load signal, the model relating the further load to the further parameter; given the further target load profile, and the model of the further sub-system, generate for the future period a further predicted monitor signal, the future period being ahead of the update window; and determine whether the further predicted monitor signal satisfies at least one further predetermined criterion.

By providing more than one sub-system, the controller can have more flexibility in how it delivers an overall load requirement.

The load controller may be operable to determine an updated load profile for the first sub-system by comparing the first predicted monitor signal to the predetermined criterion to determine a first suggested load profile, the first suggested load profile being the first target load profile confirmed as, or adapted for, satisfying the predetermined criterion; and determine an updated load profile for the further sub-system by comparing the further predicted monitor signal to the further predetermined criterion to determine a further suggested load profile, the further suggested load profile being the further target load profile confirmed as, or adapted for, satisfying the predetermined criterion.

The load controller may further comprise a load allocator, the load allocator arranged to: acquire an overall target load profile for the system, receive the first and further suggested load profiles, determine whether the combination of the first and further suggested load profiles meets the overall target load profile, and output the updated load profiles for the first and further sub-systems.

Such a load allocator allows a load to be not only shared between a plurality of sub-systems but also for load redistribution between the sub-systems. This redistribution can tend to enable the overall system to deliver loads despite certain faults.

Further, the load controller may be operable to, in the event that the first and further suggested load profiles do not fulfil the overall target load profile: determine a margin of compliance with the predetermined criterion for each of the suggested load profiles/input signals, identify any suggested load profile/input signal with an excess of compliance, compensate by adapting the excessively compliant suggested load profile to tend to fulfil the overall target load profile; and output the adapted suggested load profile as the updated load profile.

As such, the scenario where load can safely be transferred from a 'due to breach criterion' sub-system to a 'satisfying the criterion by a margin' sub-system is provided for. Thus, there is further flexibility in the sharing of load according to need and capacity.

The load allocator may be operable to issue an alert when it detects that: the overall target load profile cannot be achieved from the suggested load profiles, and there is insufficient excess of compliance between the suggested load profiles to compensate.

Such an alert can be further processed by surrounding operators or infrastructure.

The predetermined criterion may be a maximum threshold. Alternatively the criterion could be a minimum threshold, or a pass band, or a rate of approach to a certain limit, or any combination of these.

The maximum threshold may be based on a defined maximum monitor signal, and wherein to determine whether the first target load profile is satisfies the criterion, the controller is operable to apply the defined maximum monitor signal to the model of the sub-system to obtain the corresponding maximum measured load signal, and compare the maximum measured load signal to a further portion of the target load profile.

As such, the controller can quickly and simply switch from a criterion breaching load to the greatest load that is known to satisfy the criterion. Accordingly, the load that is in effect shed, is minimised.

Where more than one sub-system is provided for control by the load controller, the same parameter may be monitored at each sub-system.

The load controller may be provided with an initial model of the sub-system generated from preliminary test data, and wherein to develop the model of the sub-system, the load controller is operable to adapt the initial model.

Providing a preliminary or initial model of the sub-system can reduce the computational burden on the load controller as it operates and develops the model in real time. This may particularly be so where the preliminary model is in the form of a transfer function, with initial coefficient values established from the test data and where the development of the model can comprise simply updating these coefficients (rather than finding a completely new form of equation to define the relationship).

The load controller may be operable to develop the model repeatedly during the operational period by measuring the parameter during a plurality of incrementally advancing update windows, and for each update window, generating for an associated future period a predicted monitor signal.

The sub-system or each of the sub-systems may be an electrical device and the parameter may be the temperature of the sub-system. In particular the subsystem or each of the sub-systems may be an electrical generator and the load may be an output current for driving a load device.

According to a second aspect of the invention there is provided a method of controlling a load at a system, the system comprising a first sub-system for delivering a first load in response to a first input signal, comprising the steps of: acquiring a first target load profile, being the load initially desired for delivery by the first sub-system over an operational period; measuring in real time during an update window within the operational period: a first parameter of the first sub-system, to obtain a first measured monitor signal; and the first load, to obtain a first measured load signal; developing in real time a model of the first sub-system, using the first measured monitor signal and the first measured load signal, the model relating the first load to the first parameter; given the first target load profile, and the model of the first sub-system, generating for a future period a first predicted monitor signal, the future period being ahead of the update window; and determining whether the first predicted monitor signal satisfies at least one predetermined criterion.

BRIEF DESCRIPTION OF THE DRAWINGS

So that the invention may be understood, exemplary embodiments thereof shall now be described with reference to the following figures, of which.

DETAILED DESCRIPTION

Figure 1:
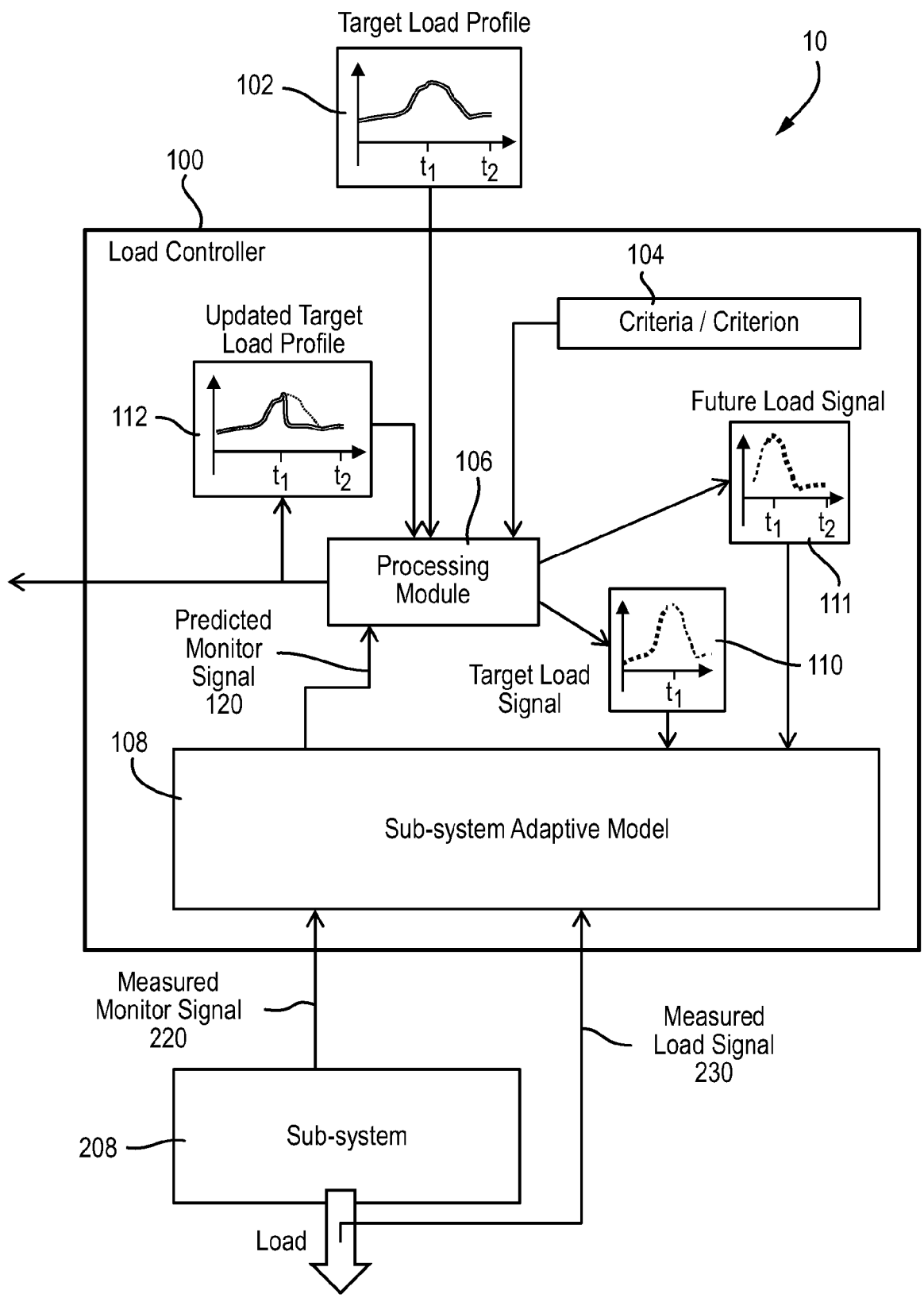
FIG. 1 shows schematically a load controller according to a first embodiment of the invention.

With reference to FIG. 1, there is shown a load controller 100 and a first sub-system 208, which are part of a general system 10. The load controller 100 and the first sub-system 208 are in communication. In particular, a signal 230 relating to a load measured at the sub-system, and a signal 220 relating to a monitored parameter of the sub-system can be sent from the sub-system 208 to the controller 100. Thus the load controller 100 does not transmit signals to the sub-system 208 and so can be considered a passive controller in the present example.

The load controller 100 comprises a processing module 106 and an adaptive model 108 of the first sub-system 208.

The processing module 106 can receive as an input a signal representing an initial target load profile 102. The target load profile 102 is the load over a period of time that an operator desires or expects the sub-system 208 to deliver. The target load profile 102 can be comprised of various phases or periods of operation and, as shown here, comprises a load which extends from time zero, through to time $t_1$ and on to time $t_2$.

Further, the processing module 106 can receive as an input at least one predetermined criterion 104, which is a condition of the sub-system 208 which should be satisfied during its operation.

Still further, the processing module 106 can receive from the model 108, a predicted monitor signal 120.

The processing module 106 can output a target load signal 110. The target load signal 110 is determined by the processing module 106 as the signal which the sub-system 208 is desired or expected to achieve in order to deliver a portion of the target load profile 102. As shown, the target load signal 110 is for delivering the target load profile 102 between time zero and time $t_1$, this period may be referred to as an update window.

The target load signal 110 is communicated to the model 108.

The processing module 106 can also determine a desired or expected future load signal 111, which is the signal which the sub-system 208 is desired or expected to achieve in order to deliver a future portion of the target load profile 102, which follows on from the first update window. As specifically shown here, the future load signal 111 delivers the portion of the target load profile 102 between time $t_1$ and time $t_2$. The future load signal 111 is sent to the model 108.

The adaptive model 108 is established from test data according to System Identification techniques.

Once so established, the model 108 can be developed in real time operation using a Forgetting Factor technique.

Thus the model is suitable for establishing a transfer function for the system, defined by certain terms each term having a coefficient, where the coefficients can be readily updated in real time.

Accordingly, the model is established without relying on a complete understanding of the physics of the sub-system. Instead, the sub-system is treated as a 'black box' for which the mathematical relationship between certain inputs (e.g. a load current supplied by a generator) and outputs (e.g. the temperature of that generator) can be determined from the data.

More specifically the model 108 is an AutoRegressive eXogenous (ARX) model which is initially established, using test data, according to a Normalised Recursive Least Squares technique. As such, before use in real time on a particular sub-system, the model is built up based on load and monitored parameter data collected from equivalent sub-systems that are known to be operating according to expected standards.

Equation 1 defines the relationship between the output and the input in terms of a transfer function:

$$y(t) = \frac{B(z)}{A(z)} U(t - n_k),\qquad \text{Equation 1}$$

Where
y(t) is the output
$U(t-n_k)$ is the input $$\frac{B(z)}{A(z)}$$

is me transfer function $$B(z) = \Sigma_{k=0}^n b_k z^{-k} = b_0 + b_1 z^{-1} + \ldots + b_n z^{-n} \text{ and}$$

$$A(z) = 1 + \Sigma_{k=1}^n a_k z^{-k} = 1 + a_1 z^{-1} + a_2 z^{-2} + \ldots$$

$n_k$ refers to the number of inherit delays of the system.

The coefficients of B(z) and A(z) can be put together into a vector θ (where θ=[a1, a2 . . . an, b0, b1 . . . bn]) hence its values are chosen in such a way that the cost function of Equation 2 is minimized (Least Squares Method).

$$V_n(\theta) = \frac{1}{N}\sum_{t=1}^{N} \frac{1}{2}[y(t) - \hat{y}(t)]^2 \qquad \text{Equation 2}$$

where
y(t) is the measured output and
$\hat{y}(t)$ is the predicted output

The cost-minimised coefficients are then used in the transfer function of Equation 1, thereby establishing the initial model from the test data.

In addition to the target load signal 110 and the future load signal 111, the model 108 receives, from the sub-system 208, the measured monitor signal 220 and the measured load signal 230.

The measured monitor signal 220 is the time profile of a parameter of the sub-system and in particular a parameter from which the satisfaction (or not) of the predetermined criterion 104 can be assessed. The measured monitor signal 220 can be collected in real time.

The measured load signal 230 is the actual value of the load that the sub-system 208 is delivering. The measured load signal 230 can be collected in real time.

The initial model can be adapted during real time operation, using the measured load signal 230 and the measured monitor signal 220 according to the forgetting factor technique of Equation 3.

$$\hat{\theta}(t) = \hat{\theta}(t-1) + K(t)(y(t) - \hat{y}(t)) \qquad \text{Equation 3}$$

Where $$\hat{y}(t) = \psi^T(t)\hat{\theta}(t-1)$$

$$K(t) = Q(t)\psi(t)$$

$$Q(t) = \frac{P(t-1)}{\lambda + \psi^T(t)P(t-1)\psi(t)}$$

$$P(t) = \frac{1}{\lambda}\left(P(t-1) - \frac{P(t-1)\psi(t)\psi^T(t)P(t-1)}{\lambda + \psi^T(t)P(t-1)\psi(t)}\right)$$

Q(t) is obtained by minimizing $\Sigma_{k=1}^t \lambda^{t-k}(y(k) - \hat{y}(k))^2$
d(t) is the parameter/coefficient vector,
y(t) is the measured output
$\hat{y}(t)$ is the predicted model output,
ψ(t) is the gradient of the predicted model output,
K(t) is a gain that determines how much the current prediction error affects the update of the parameter estimate,
P(t) is the inverse of the input correlation matrix, and
λ is the forgetting factor, $0 \leq \lambda \leq 1$ Adapting the initial model according to the Forgetting Factor technique of Equation 3 leads to an updated model. The future load signal 111 can then be applied to the updated model to generate the predicted monitor signal 120.

Hence, with knowledge of the predicted monitor signal 120 generated by the model 108 and also with knowledge of the criterion 104, and the target load profile 102, the processing module 106 is able to generate an updated target load profile 112.

This updated target load profile 112 is used at the processing module 106 to create a further target load signal and a further future load signal, for the next period. For example, for the FIG. 1 arrangement, the further target load signal would be for the period $t_1$ to $t_2$, and the further future load signal would be for the period $t_2$ to $t_3$ ($t_3$ not shown).

The generation of the updated target load profile 112 will now be discussed in the particular context where the sub-system is an electrical generator. However, the load controller 100 is suitable for use on various different sub-systems.

Electrical generators convert a mechanical rotation into an electrical power supply with an expected current and the exemplary generator considered here is a three-phase 5KVA, 240 VAC generator operating at 1500 rpm to produce the nominal voltage (240V). Each generator is configured such that once started up and working properly (i.e. with no faults) a constant voltage and uninterrupted electrical power supply is provided. (However the power can fluctuate with the current).

Where the sub-system 208 is a generator, the sub-system load 230 is an electrical load current and accordingly the target load profile 102 is a target electrical load current. Each of these are sampled and fed back to the adaptive model 108.

Further, the measured monitor signal 220 is chosen as the temperature profile over time of the generator, and more specifically a temperature measurement derived from the temperature of the generator's stator windings and the generator's stator core. Such temperatures are typically a factor in temperature-related failures of generators. The criterion 104 is therefore chosen to be a maximum threshold for the temperature of the windings, for example here 100° C.

Accordingly, in operation on a generator, the load controller 100 receives a target load current profile 102 which the generator 208 is expected to deliver. This current may be input by an operator uploading data to the load controller 100, and may have been compiled with advance knowledge of operational requirements.

In the present example where the generator is as set out above, the rate of mechanical rotation is taken as fixed and the target load signal will provide a load current of around 2 A to an electrical load.

The target load current profile 102 is broken down at the processing module 106 into a present or target load current 110 and a future load current 111.

As the generator 208 operates, it will tend to heat up, for example at the stator windings and core.

As the adaptive model 108 receives the real time signals on the temperature 220 and load current 230 it acts to assess whether these signals (e.g. the data associated therewith) are behaving according to their previously determined relationship and develops the model accordingly.

If the relationship is consistent, then the aggregation of the further data tends to refine the forgetting factor to improve the accuracy of the model.

However, if a departure from the previously determined relationship emerges (such as may be associated with a fault emerging), the data will tend to adapt the model using the re-weighting of the forgetting factor to shift towards recent data, thereby better reflecting the present state of the generator and enabling predictions of temperature given load to be made even as the system changes.

After an update window, it can be taken that a sufficient amount of real time data has been collected from the generator to develop the generator model. Often, the update window will be of such duration that each sample of real time data is fed back into the generator model 108 immediately, rather than queuing up a batch of samples to feed back.

At such point, a future period of the target current 111 can be input to the adaptive model 108 so that the adaptive model 108, now updated with an update window's data, can generate a prediction of monitored temperature for that period 120.

The predicted monitor temperature 120 is fed into the processing module 106 where it is compared to the criterion 104 to determine whether that predicted monitor temperature 120 will be satisfactory.

The specific criterion 104 applied in the present example is a maximum threshold temperature.

If the predicted temperature 120 for the future period under consideration is entirely below this threshold, then the processing module 106 can continue to deliver the target load profile 102. Subsequently the portion of the target load profile 102 following on from the $t_1$ to $t_2$ portion can be fed into the sub-system adaptive model 108 as the future load signal 111.

However, if the predicted temperature 120 for the future period under consideration suggests that the monitor temperature will exceed the maximum permissible temperature (i.e. the criterion is not satisfied), then the processing module 106 will, in conjunction with the adaptive model 108, generate a suggested updated target signal profile 112 for that period which will not exceed the temperature threshold.

This updated target signal profile 112 is fed back into the processing module so that subsequent future load signals 111 can be generated, and can also be output from the load controller 100 to an actuator or switch (not shown) so that the load can be shed from the generator, and optionally reallocated (e.g. to another generator).

To generate the updated target load profile in order to maintain operation below a threshold, the processing module 106 determines, using the most recent version of the adaptive model 108, a maximum load current which can be applied to the generator 208 without exceeding the maximum temperature, and applies this input as the load current.

Thus an updated target load profile 112 for the future period, can be applied to the generator whereupon the process may repeat for the next section of the target load profile 102 such that signals in a further calibration period are monitored for a further future period.

Figure 2A:
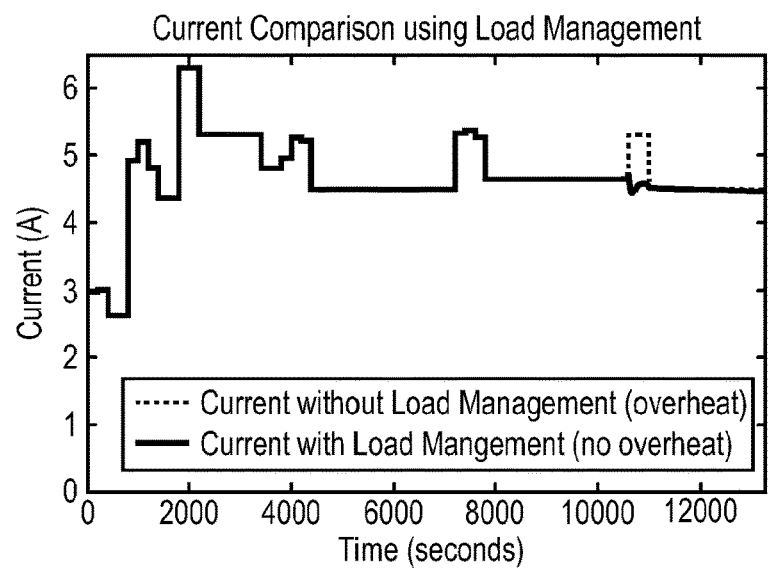
FIGS. 2a, 2b and 2c show data from a simulation of a generator driven in combination with a load controller of the type shown in FIG. 1.
Figure 2B:
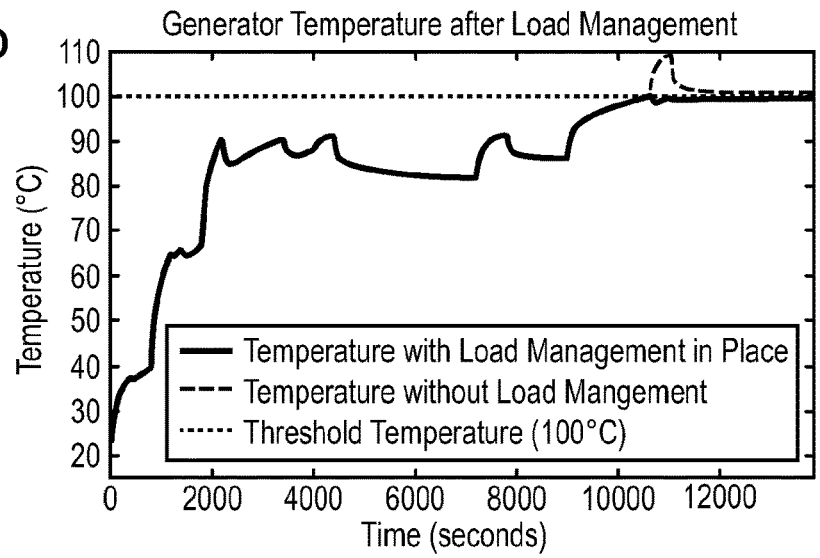
Figure 2C:
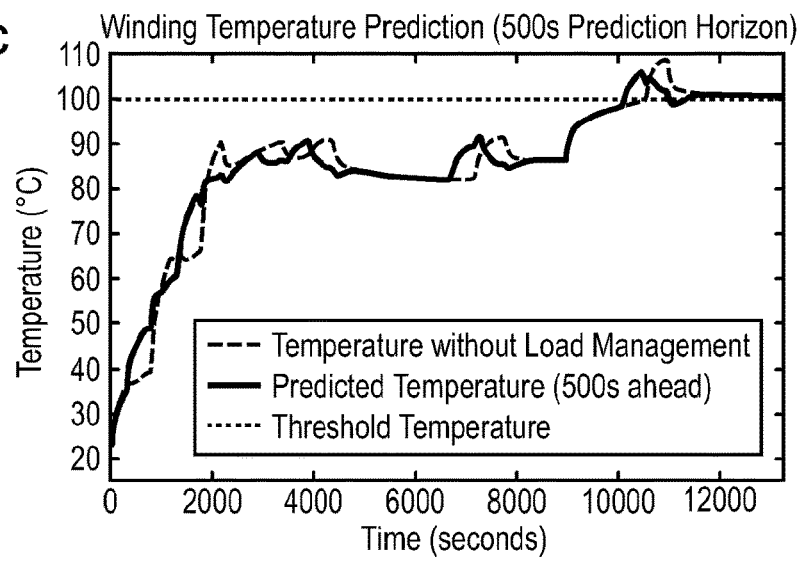

A simulation of a generator with a criterion-applying load controller was performed for approximately 14,000 seconds, and results are plotted in FIGS. 2a, 2b and 2c.

With reference to FIG. 2a, the dotted-line plot, which is mostly coincident with and obscured by the solid line plot, shows the load current as would be expected without criterion-based management by the load controller. This dotted line plot may for example represent the target load profile 102.

It can be seen that this unmanaged load current, after an initial steep rise to over 6 A, falls back to deliver a steady current of about 4.5 A, with two raised plateau phases (one just after 7,000 s, the other just before 11,000 s) which peak at slightly over 5 A.

The solid-line plot of FIG. 2a shows the load current 230 as delivered when the generator is regulated by the controller according to the adaptive model and the criterion.

It can be seen that this managed load current, is similar to the dotted-line unmanaged plot insofar as after an initial steep rise to over 6 A, the load current falls back to deliver a 4.5 A, with an initial raised plateau phase at just after 7,000 s to just over 5 A. However, here the second raised plateau phase has been clipped and the load current does not exceed 4.5 A after 8,000 s.

A predicted load current plot is not shown, but would resemble the dotted line shifted 500s to the left. That is to say, the model predicts 500s in advance what the load signal will be if the criterion is not applied. (This may for example be the future input signal 111 derived from the target load profile 102).

The load current output by the generator tends to raise the temperature of the generator. This temperature rise is demonstrated in FIGS. 2b and 2c.

The dashed-line of FIG. 2b shows the temperature/measured monitor signal 220 for the generator without application of the load controller criterion, and the solid line shows the temperature/measured monitor signal 220 for the generator where the load controller criterion has been applied. Until about 10500 s, the solid-line and the dashed-line are coincident.

There is also shown, as a horizontal dotted line, the threshold temperature 104 at 100° C., representative of the criterion being applied.

FIG. 2c shows firstly the temperature/measured monitor signal 220 (as a dashed line as in FIG. 2b) for the generator without the load controller criterion applied, and secondly, as the solid line, the predicted temperature/predicted monitor signal 120.

The predicted/initial target load current 102 and predicted temperature lead their measured equivalents by about 500 s indicating that the load is predicted 500 s ahead of the real time moment. This period may be referred to as the prediction horizon.

For the first 9,000 s of the simulation, the measured current follows the predicted/target current, and the measured temperature generally follows the predicted temperature, albeit with the 500 s time difference.

As can be seen, in FIG. 2b, the temperature of a generator without the load controller criterion applied initially climbs steeply from 20° C. to 90° C. as the load current rises. The temperature then tends to level out between 80 and 90° C. as the load current levels out. There is a raised temperature portion between about 7,000 s and 8,000 s in response to the first plateau phase in load current.

However at around 9,000 s a generator fault is introduced to the simulation.

The fault increases winding losses in the generator, and the temperature climbs.

The generator fault changes the relationship between the measured current and the measured temperature, which in turn leads to an adaptation of the model.

The model, as adapted, leads to a prediction that the 100° C. threshold temperature will be exceeded at 10,500 s. This prediction is made 500 s earlier, at 10,000 s, and so the system has time to respond to prevent the threshold being exceeded. Accordingly, the processing module applies, just before 10,500 s, an updated target load profile 112 that results in a lower load current (i.e. the clipping of the second plateau phase) and accordingly the maximum temperature is not exceeded (see how the measured temperature follows the threshold line in FIG. 2b).

The updated target load profile 112 is determined by taking the threshold temperature and inputting this to the latest version of the sub-system model 108 to determine the maximum permissible load current given the present operating state of the generator. This maximum permissible load current can then be applied as the updated target load profile 112.

Accordingly, whilst the target load profile is not wholly delivered after 10,500 s, a portion of the load is still delivered and the simulated load controller prevents the simulated generator from overheating, which could cause the generator to break down.

Figure 3:
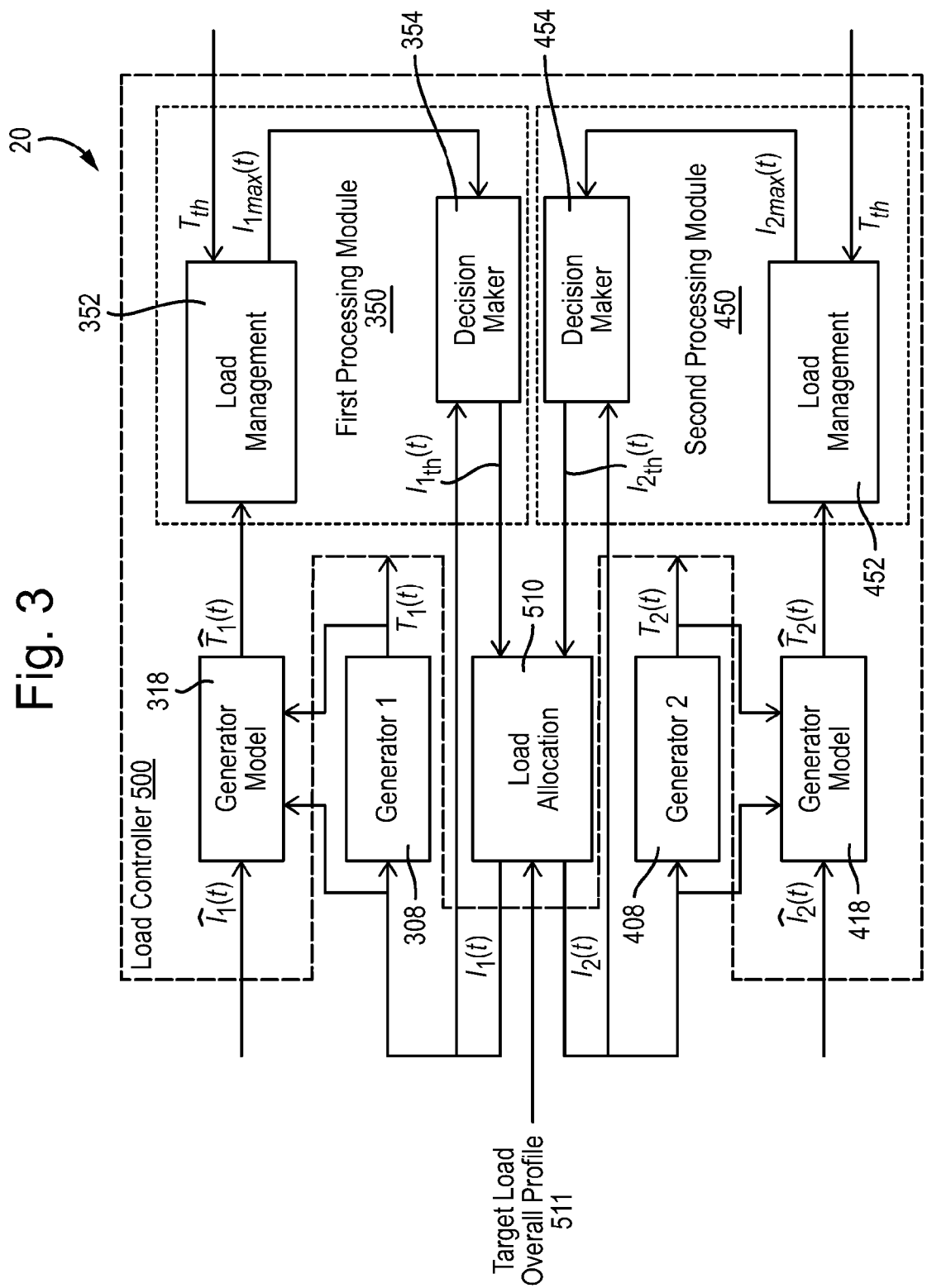
FIG. 3 shows schematically a load controller according to a second embodiment of the invention and configured to control two generators.

With reference to FIG. 3 a second embodiment of the invention is shown where the general system 20 comprises two sub-systems, in particular a first generator 308 and a second generator 408.

Each of the first 308 and second 408 generators is equivalent to the example generator above i.e. a three-phase 5KVA, 240 VAC generator operating at 1500 rpm.

These sub-systems 308, 408 are controlled by a load controller 500.

For the first generator 308, the load controller 500 comprises an adaptive model of the first generator 318 and a first processing module 350.

The first generator 308 delivers a first load current profile $I_1(t)$ analogous to the measured load signal 230 of the first embodiment. The first generator 308 is also monitored to provide the first resulting temperature signal $T_1(t)$, analogous to the measured monitor signal 220.

The first generator model 318 receives as inputs the first generator temperature $T_1(t)$ and the first generator load current $I_1(t)$. Further, the first generator model 318 receives a future first load current $\hat{I}_1(t)$ signal, analogous to the future load signal 111. The first generator model 318 outputs a predicted temperature for the first generator $\hat{T}_1(t)$.

The first processing module 350 comprises a first load management module 352 and a first decision maker module 354.

The first load management module 352 receives as an input the first predicted temperature $\hat{T}_1(t)$ and a first maximum temperature threshold $T_{th}$ (the criterion); the load management module 352 outputs a first maximum permissible load current $I_{1max}(t)$, determined using the most up to date adaptive model 318 for that generator The first decision maker 354 receives as input the first maximum permissible load current $I_{1max}(t)$ and the first load current $I_1(t)$; the decision maker 354 outputs a suggested first load current $I_{1th}(t)$.

For the second generator 408, the load controller 500 comprises an adaptive model of the second generator 418 and a second processing module 450.

Equivalent to the first generator 308, the second generator 408 provides signals representative of the second generator load $I_2(t)$ and the second generator temperature $T_2(t)$, which are relayed to the second generator model 418 to update the transfer function therein.

The second generator model 418 receives as an input the expected future load current $I_2(t)$, and outputs a predicted future temperature $\hat{T}_2(t)$ for the second generator 408.

This predicted temperature $\hat{T}_2(t)$ is input to the second processing module 450, specifically a load management module 452. Also input to the second load management module 452 is the second criterion i.e. the second temperature threshold. In the present example, the second criterion and the first criterion are the same, $T_{th}$. Other embodiments may apply different criteria to different sub-systems.

Accordingly, by accessing the up to date transfer function in the adaptive model 418, the second load management module 452 is able to generate from the temperature threshold a maximum second generator load current, $I_{2max}(t)$.

The maximum second generator load current $I_{2max}(t)$ is fed into a second generator decision maker 454, where it is compared to the second load profile $I_2(t)$ for the relevant period. Accordingly, the second decision maker 454 outputs as the suggested load current $I_{2th}(t)$ whichever is smaller out of $I_{2max}(t)$ and $I_2(t)$.

The second processing module 450 is equivalent to the first processing module 350 insofar as it has equivalent modules (second decision maker 454 being equivalent to first decision maker 354, second load management module 452 being equivalent to first load management module 352) communicating equivalent signals. However in practice the signals input and output can differ from the first module 350, as can the transfer functions or logic of the modules.

The load controller 500 further comprises a load allocation module 510. The load allocation module 510 receives as inputs the suggested first load current $I_{1th}(t)$ and the suggested second load current $I_{2th}(t)$ and outputs the first load current $I_1(t)$ and the second load current $I_2(t)$. The load controller 500 also receives a signal, the Target Load Overall Profile 511, indicating the overall load which the generators are to provide.

In the present example, the first and second generators are substantially identical, AC generators with the same rating, and so can be assumed to initially, and in the absence of failure, operate equivalently and be able to provide the same target load contributing equally to the overall load. Also, the first and second maximum temperatures are set to be the same temperature.

Prior to operation, a model for each of the generators 318, 418 is developed by running an equivalent generator in a controlled environment and monitoring the inputs and outputs to record test data. This test data can be converted in a mathematical transfer function defining the generator as a set of factors, each having a coefficient associated therewith. In the present embodiment, the transfer function was used to relate the load current of the generator (the input) to the temperature of the generator (the output), using the AutoRegressive eXogenous (ARX) model described above.

In operation a user may have a requirement to supply a certain electrical load current using a combination of the first and second generators 308, 408. This load current could be for providing power to various electrical components such as actuators, motors, and avionics systems.

The user may then feed that requirement into the system 20 as an overall target load profile 511. This initial target load profile can then be divided, by the load allocator 510, into two initial target load current profiles, one for the first generator 308, one for the second generator 408.

The first target load profile and second target load profiles are fed as suitable inputs, in real time, into their respective generators 308, 408 to deliver the load current.

For each generator 308, 408, the actual load current output and the temperature of the generator are measured, and fed into the respective generator models 318, 418. This real time data is used to adapt the transfer function of the respective adaptive model by changing the forgetting factor as described above.

Further, the load current profiles are fed into the respective decision maker modules 354, 454.

Meanwhile, a future section of the target load profile is fed into the respective generator model and a predicted temperature is generated using the latest generator model. The predicted temperature is fed into the load management module 352, 452.

At each load management module 352, 452, the predicted temperature is compared to the maximum threshold temperature. Accordingly, a maximum permissible load current for the generator, given current operational behaviour (ie given the current state of the model), is determined. This maximum permissible load current is fed into the respective decision maker 354, 454.

Subsequently, the decision maker module can generate, from the maximum permissible current and the load current profile, a suggested current for the future period.

For instance, if for a given time period the load current is less than the maximum permissible load current, the decision maker will output a suggested current equal to the load current. However if the load current is equal to or greater than the maximum permissible current, then the suggested current will be equal to the maximum permissible current.

The suggested currents from the first and second processing modules 350, 450 are passed to the load allocation module 510 where they can be summed and compared to the overall load profile.

In a first operational scenario, the sum of the loads $I_{1th}(t)$, $I_{2th}(t)$ suggested by the first and second processing modules is sufficient to fulfil the overall load profile 511, and no adjustment to the load profiles $I_1(t)$, $I_2(t)$ needs to be taken at that time.

In another operational scenario, which is here termed the 'rebalance' scenario, the combined operation of one generator model and its processing module predict that the generator will overheat if the future load profile is strictly adhered to. Meanwhile, the other combined operation of the other generator model and its processing module predict that its generator is not due to overheat and in fact is operating within limits by a comfortable margin. Such a determination can be made by comparing the predicted temperature to the maximum temperature and finding that the predicted temperature is a sufficient margin below the maximum temperature.

In this rebalance scenario, the decision maker for the overheating generator will 'shed load' by feeding in a lower current as the suggested load current to the load allocation module (i.e. $I_{nth}(t)=I_{nmax}(t)$). Thus the temperature of the generator will tend to be stabilised at the maximum temperature.

Meanwhile the decision maker module for the healthy generator (i.e. showing no signs of fault or failure) will feed in the unamended current profile to the load allocation module (i.e. $I_{mth}(t)=I_m(t)$).

Accordingly a lowered current profile for one generator, and an unamended current profile for the other generator are suggested to the load allocation module 510 for the upcoming time period. These current profiles are summed and compared to the overall current profile 511 whereupon it is determined that the overall current profile initially provided cannot be satisfied.

At this point the load allocator 510 determines for the unamended current profile the margin of compliance (positive or negative) of the predicted temperature with the maximum temperature. Once a predicted temperature is identified which is below the maximum temperature threshold, the load allocator 510 increases the future current input for that, presently comfortable, generator so as to compensate as much as possible for the load which will be shed by reducing the current load for the overheating generator.

In yet another operational scenario, both generators may be predicted to overheat, and so may both have their future current loads reduced to prevent a failure, and in so doing shed load such that the overall target load cannot be met ($I_{1th}(t)=I_{1max}(t)$, and $I_{2th}(t)=I_{2max}(t)$). In this 'full failure' scenario, a warning signal can be generated to alert the operator.

Figure 4:
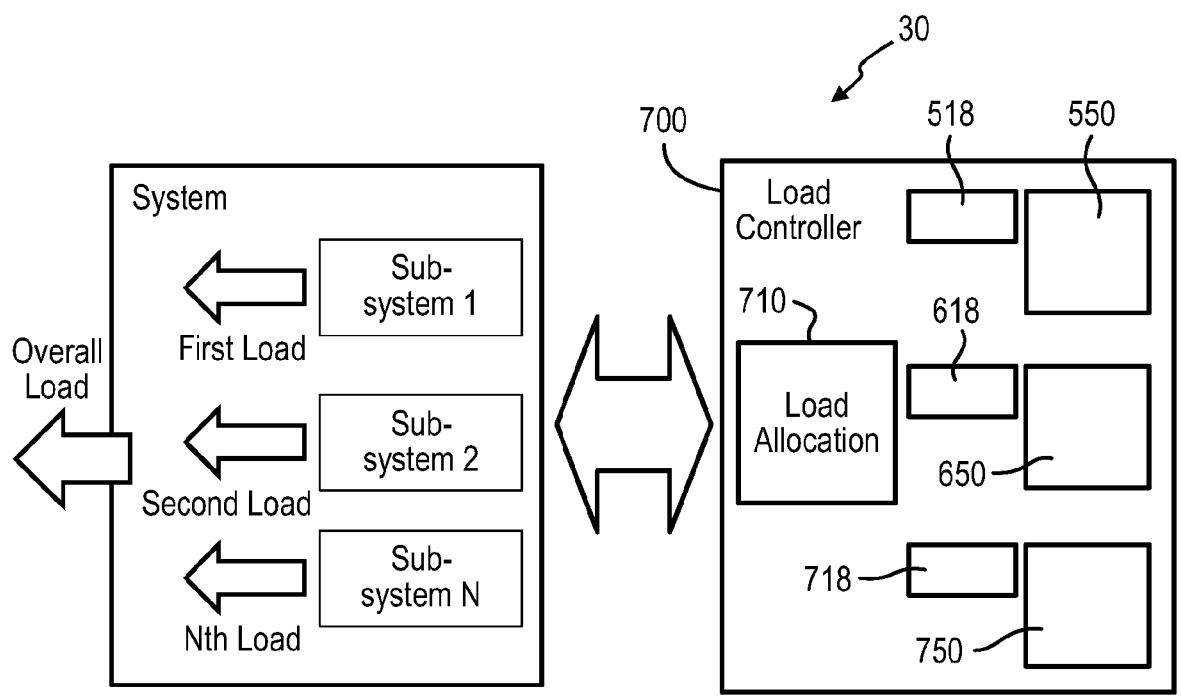
FIG. 4 shows schematically a load controller according to a third embodiment and configured to control more than two sub-systems.

With reference to FIG. 4, there is provided a system 30 where there are more than two sub-systems, each of which communicates with a load controller 700 and contributes to the delivery of an overall load.

At the load controller 700 there is provided a model 518, 618, 718 for each of the sub-systems 1, 2, N and a processing module 550, 650, 750 for each of the sub-systems. Further, a single load allocator 710 is provided.

The system communicates with the controller 700 in accordance with the principles set out for the previous embodiments. Thus for each of the sub-systems, a respective load profile is acquired at a respective load controller and fed into the system, and meanwhile for each sub-system, a respective measured monitor signal and a respective measured load signal is fed back into the respective adaptive model in the respective load controller.

Whilst examples provided above have been for the operation of the load controller in controlling the temperature of an electrical generator, the invention is contemplated for use with various other sub-systems.

For example the sub-system under control could be a motor where the load is the overall torque or rotation rate delivered, the input signal is the current, and the temperature is the parameter being monitored.

It is contemplated that the load controller could be implemented on any number of computing devices with suitable I/O modules and DACs/ADCs in order to in real time (aka with sufficiently minimal latency) read the various signals coming in, deliver the signals going out, and interface with a human operator (for example so that the predetermined criterion and target loads can be set) whilst also having sufficient processing power to re-calculate the model of the sub-system based on a new batch of data (i.e. that collected in the update window) etc., whilst having commensurate memory provisions.

Accordingly the controller could be implemented on a personal computing device or an FPGA.

Whilst the modules and models of the controller have been treated as separate within the controller, the skilled person would appreciate that such separation can in certain computing devices exist only insofar as the software calls upon separate modules and routines; there is no inherent need for separate hardware for each of the modules.

What is claimed is:

1. A load controller for a system, the system comprising a first sub-system arranged to deliver a first load and a second sub-system arranged to deliver a second load, the load controller being configured to:
   receive as an input a first target load profile, said first target load being a load initially desired for delivery by the first sub-system over an operational period;
   receive from the first sub-system in real time during an update window within the operational period:
      a first parameter of the first sub-system, to obtain a first measured monitor signal; and
      a first signal of the first load, to obtain a first measured load signal;
   develop in real time a first model of the first sub-system, using the first measured monitor signal and the first measured load signal, the first model relating the first load to the first parameter;
   according to the first target load profile, and the first model of the first sub-system, generate for a first future period a first predicted monitor signal, the first future period being ahead of the update window;
   determine whether the first predicted monitor signal satisfies at least one predetermined first criterion;
   receive as an input a second target load profile, said second target load being a load initially desired for delivery by the second sub-system over the operational period;
   receive from the second sub-system in real time during the update window within the operational period:
      a second parameter of the second sub-system, to obtain a second measured monitor signal; and
      a second signal of the second load, to obtain a second measured load signal;
   develop in real time a second model of the second sub-system, according to the second measured monitor signal and the second measured load signal, the second model relating the second load to the second parameter;
   according to the second target load profile, and the second model, generate for a second future period a second predicted monitor signal, the second future period being ahead of the update window; and
   determine whether the second predicted monitor signal satisfies at least one predetermined second criterion.

2. The load controller according to claim 1, wherein the load controller is further configured to:
   recognise that the first predicted monitor signal is incompatible with the predetermined criterion; and
   determine at the first processing module an updated load profile for the first sub-system such that the first predicted monitor signal satisfies the predetermined criterion.

3. The load controller according to claim 1, wherein the load controller is further operable configured to
   determine a first updated load profile for the first sub-system by comparing the first predicted monitor signal to the predetermined first criterion to determine a first suggested load profile, the first suggested load profile being the first target load profile confirmed as, or adapted for, satisfying the predetermined first criterion; and
   determine a second updated load profile for the second sub-system by comparing the second predicted monitor signal to the predetermined second criterion to determine a second suggested load profile, the second suggested load profile being the second target load profile confirmed as, or adapted for, satisfying the predetermined second criterion.

4. The load controller according to claim 3 further comprising a load allocator, the load allocator being configured to:
   acquire an overall target load profile for the system;
   receive the first and second suggested load profiles;
   determine whether the combination of the first and second suggested load profiles meets the overall target load profile; and
   output the updated load profiles for the first and second sub-systems.

5. The load controller according to claim 4, wherein the load controller is further configured to, in the event that the first and second suggested load profiles do not fulfil the overall target load profile:
   determine a margin of compliance with the predetermined criterion for each of the first and second suggested load profiles;
   identify any suggested load profile with an excess of compliance;
   compensate by adapting the excessively compliant suggested load profile to tend to fulfil the overall target load profile; and
   output the adapted suggested load profile as the updated load profile.

6. The load controller according to claim 5 wherein the load allocator is further configured to issue an alert when it detects that:
   the overall target load profile cannot be achieved from the suggested load profiles; and
   there is insufficient excess of compliance between the suggested load profiles to compensate therefor.

7. The load controller according to claim 1, wherein the predetermined first criterion is a maximum threshold.

8. The load controller according to claim 7 wherein the maximum threshold is based on a defined maximum monitor signal, and wherein to determine whether the first target load profile satisfies the first criterion, the controller is further configured to apply the defined maximum monitor signal to the first model of the first sub-system to obtain a corresponding maximum measured load signal, and compare the maximum measured load signal to a further portion of the target load profile.

9. The load controller according to claim 1, wherein at each of the first and second sub-systems the same parameter is monitored.

10. The load controller according to claim 1, wherein the load controller is provided with an initial model of the first sub-system, the initial model being generated from preliminary test data, and wherein the load controller is configured to develop the first model of the first sub-system, by adapting the initial model.

11. The load controller according to claim 1, wherein the load controller is further configured to:

develop the first model repeatedly during the first operational period by measuring the first parameter during a plurality of incrementally advancing update windows: and for each of the incrementally advancing update windows, generate for an associated future period a predicted monitor signal.

12. The load controller according to claim 1, wherein the first sub-system is an electrical device and the first parameter is a temperature of the first sub-system.

13. The load controller according to claim 1, wherein the first subsystem is an electrical generator and the first load is an output current for driving a load device.

14. A method of controlling a load at a system, the system comprising a first sub-system for delivering a first load and a second sub-system arranged to deliver a second load, the method comprising:

receiving as an input a first target load profile, said first target load being a load that is initially desired for delivery by the first sub-system over an operational period;

receiving from the first sub-system in real time during an update window within the operational period:
  a first parameter of the first sub-system, to obtain a first measured monitor signal; and
  a first signal of the first load, to obtain a first measured load signal;

developing in real time a model of the first sub-system, using the first measured monitor signal and the first measured load signal, the model relating the first load to the first parameter;

according to the first target load profile and the model of the first sub-system, generating for a future period a first predicted monitor signal, the future period being ahead of the update window;

determining whether the first predicted monitor signal satisfies at least one predetermined criterion;

receiving as an input a second target load profile, said second target load being a load that is initially desired for delivery by the second sub-system over the operational period;

receiving from the second sub-system in real time during the update window within the operational period:
  a second parameter of the second sub-system, to obtain a second measured monitor signal; and
  a second measured load signal of the second load;

developing in real time a second model of the second sub-system, according to the second measured monitor signal and the second measured load signal, the second model relating the second load to the second parameter;

according to the second target load profile, and the second model, generating for a second future period a second predicted monitor signal, the second future period being ahead of the update window; and determining whether the second predicted monitor signal satisfies at least one predetermined second criterion.

* * * * *